(12) United States Patent
Dupéré

(10) Patent No.: US 9,556,914 B2
(45) Date of Patent: Jan. 31, 2017

(54) DRIVE SHAFT CONNECTION ASSEMBLY

(71) Applicant: Donald Dupéré, Mactier (CA)

(72) Inventor: Donald Dupéré, Mactier (CA)

( * ) Notice: Subject to any disclaimer, the term of this patent is extended or adjusted under 35 U.S.C. 154(b) by 0 days.

(21) Appl. No.: 14/712,005

(22) Filed: May 14, 2015

(65) Prior Publication Data

US 2016/0333939 A1 Nov. 17, 2016

(51) Int. Cl.
*E21B 17/046* (2006.01)
*F16B 7/04* (2006.01)
*F16D 1/112* (2006.01)
*F16D 1/06* (2006.01)
*F16D 1/108* (2006.01)

(52) U.S. Cl.
CPC ............... *F16D 1/06* (2013.01); *E21B 17/046* (2013.01); *F16B 7/042* (2013.01); *F16D 1/108* (2013.01); *F16D 1/112* (2013.01); *Y10T 403/7018* (2015.01)

(58) Field of Classification Search
CPC ........ E21B 10/44; E21B 17/046; F16B 7/042; F16B 7/105; F16D 1/06; F16D 1/108; F16D 1/112; F16D 2001/062
USPC .......... 403/355, 361, 375–378, 379.1, 379.5, 403/383; 464/112–114, 136, 182, 905
See application file for complete search history.

(56) References Cited

U.S. PATENT DOCUMENTS

| | | | |
|---|---|---|---|
| 1,588,128 A * | 6/1926 | Montgomery | ........ E21B 17/046 403/47 |
| 2,315,414 A * | 3/1943 | Germany | .............. E21B 17/046 24/572.1 |
| 3,662,844 A | 5/1972 | Baker | |
| 3,833,071 A | 9/1974 | Koosman et al. | |
| 3,986,570 A | 10/1976 | Stinson et al. | |
| 5,115,691 A * | 5/1992 | Beauch | .................. B62D 1/192 280/777 |
| 5,655,692 A | 8/1997 | Navin et al. | |
| 6,190,392 B1 | 2/2001 | Vandewalle et al. | |
| 6,276,464 B1 * | 8/2001 | Draney | ................. E21B 17/046 166/96.1 |
| 6,325,724 B1 * | 12/2001 | Sato | .......................... F16D 3/40 464/114 |
| 6,502,649 B1 | 1/2003 | Havel | |
| 6,626,765 B2 * | 9/2003 | Kim | ......................... B62D 1/16 403/109.6 |
| 7,121,205 B2 * | 10/2006 | Ono | ..................... G03G 15/757 464/136 |
| 7,131,506 B2 | 11/2006 | Hamilton et al. | |
| 7,669,673 B1 | 3/2010 | Matthias et al. | |

(Continued)

FOREIGN PATENT DOCUMENTS

EP 563494 A2 * 10/1993 ........... E21B 17/046
EP 2711497 A1 * 3/2014 ............... F16D 1/05

*Primary Examiner* — Josh Skroupa

(57) ABSTRACT

A drive shaft connection assembly includes a first coupler having a top end and a bottom end. The top end has an upper well for releasably engaging a drive shaft. A second coupler has an upper end and a lower end. A post is attached to and extends upwardly from the upper end. An auger connector is attached to and extends downwardly from the lower end. The bottom end has a lower well extending upwardly therein to removably receive the post. The post is rotatable with respect to the first coupler to selectively engage or disengage the first coupler. A sleeve is slidably mounted on the perimeter wall and is removably slidable over the first and second couplers prevent their movement with respect to each other.

3 Claims, 2 Drawing Sheets

(56) References Cited

U.S. PATENT DOCUMENTS

| | | | |
|---|---|---|---|
| 8,485,798 B2* | 7/2013 | Sheth | F04D 13/022 |
| | | | 464/182 |
| 2005/0205298 A1 | 9/2005 | Kollasch et al. | |
| 2006/0089202 A1* | 4/2006 | Losi | F16D 3/30 |
| | | | 464/114 |
| 2013/0146305 A1* | 6/2013 | Dupal | E21B 17/046 |
| | | | 166/380 |
| 2014/0328613 A1* | 11/2014 | Kaphengst | F16D 1/06 |
| | | | 403/376 |
| 2015/0005081 A1* | 1/2015 | Harnetiaux | F16D 3/38 |
| | | | 464/162 |

\* cited by examiner

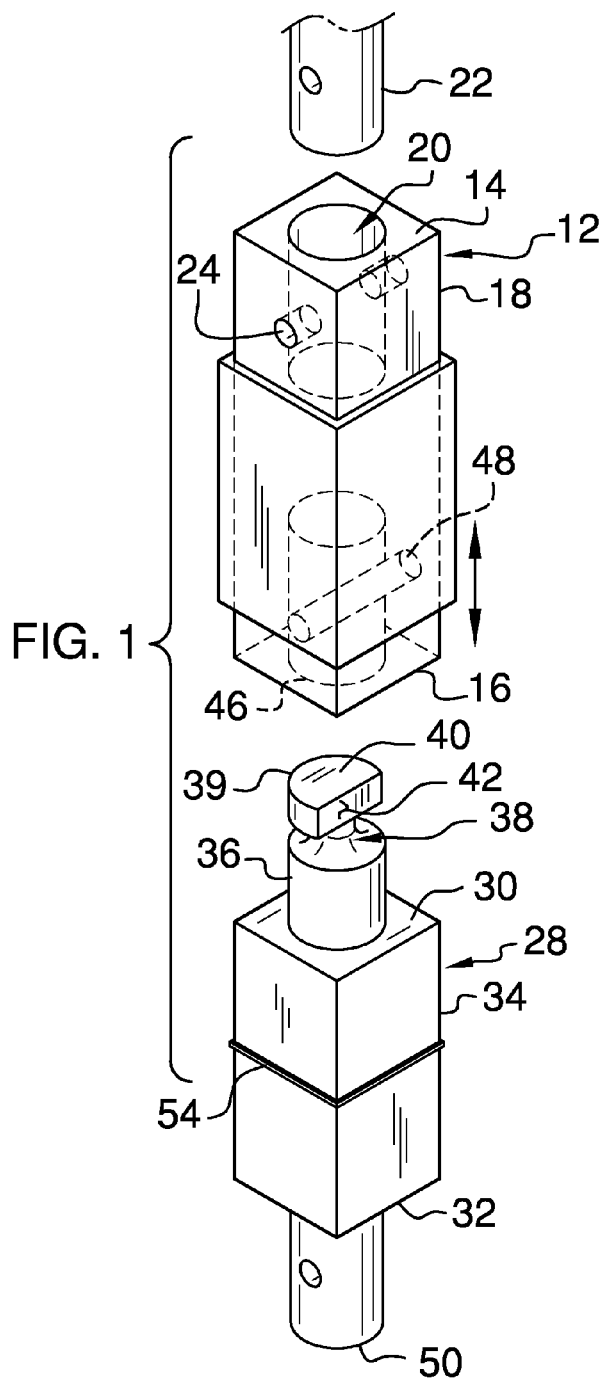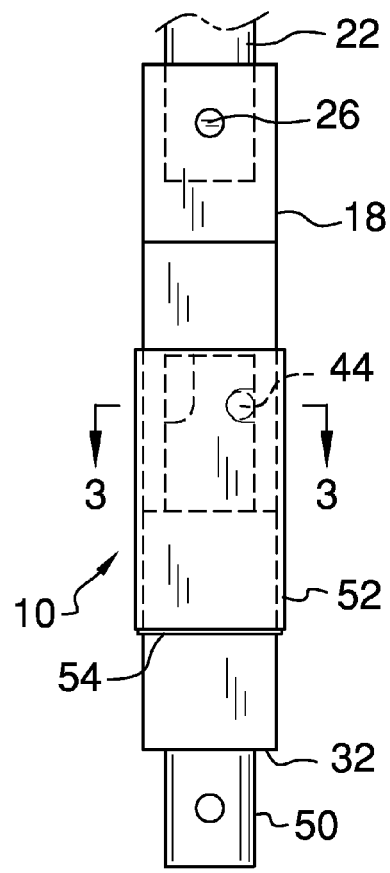

DRIVE SHAFT CONNECTION ASSEMBLY

BACKGROUND OF THE DISCLOSURE

Field of the Disclosure

The disclosure relates to drive shaft connection devices and more particularly pertains to a new drive shaft connection device for allowing quick disconnections between an auger motor and an auger blade.

SUMMARY OF THE DISCLOSURE

An embodiment of the disclosure meets the needs presented above by generally comprising a first coupler having a top end, a bottom end and a perimeter wall attached to and extending between the top and bottom ends. The top end has an upper well for receiving and releasably engaging a drive shaft. A second coupler has an upper end, a lower end and a peripheral wall extending between the upper and lower ends. A post is attached to and extends upwardly from the upper end. An auger connector is attached to and extends downwardly from the lower end. The bottom end has a lower well extending upwardly therein to removably receive the post. The post is rotatable with respect to the first coupler to selectively engage or disengage the first coupler. A sleeve is slidably mounted on the perimeter wall and is removably slidable over the peripheral wall such that the sleeve engages each of the first and second couplers to prevent the first coupler from rotating with respect to the second coupler. The sleeve is disengageable from the second coupler to allow rotation of the post with respect to the first coupler to release the post from the lower well.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 1 is a front perspective view of a drive shaft connection assembly according to an embodiment of the disclosure.

FIG. 2 is a side view of an embodiment of the disclosure.

DESCRIPTION OF THE PREFERRED EMBODIMENT

Figure 3:
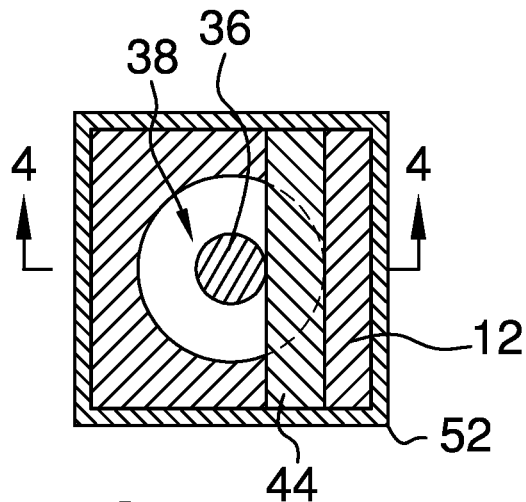
FIG. 3 is a cross-sectional view of an embodiment of the disclosure taken along line 3-3 of FIG. 2.
Figure 4:
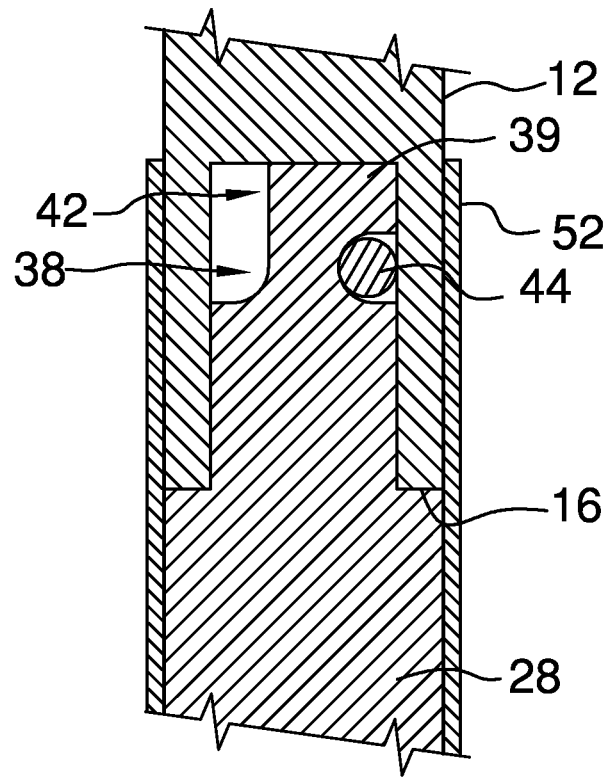
FIG. 4 is a cross-sectional view of an embodiment of the disclosure taken along line 4-4 of FIG. 3.

With reference now to the drawings, and in particular to FIGS. 1 through 5 thereof, a new drive shaft connection device embodying the principles and concepts of an embodiment of the disclosure and generally designated by the reference numeral 10 will be described.

As best illustrated in FIGS. 1 through 5, the drive shaft connection assembly 10 generally comprises a first coupler 12 having a top end 14, a bottom end 16 and a perimeter wall 18 that is attached to and extends between the top 14 and bottom 16 ends. The top end 14 has an upper well 20 therein configured for receiving and releasably engaging a drive shaft 22. The drive shaft 22 is conventional to many devices and in particular ice augers. Ice augers also conventionally include a linkage between the auger blade and the drive shaft 22 which the assembly 10 will replace. However, the assembly 10 may be used with other drive shaft systems where a quick release device would be beneficial to the user. The first coupler 12 has a first pin receiver 24 therein extending through the upper well 20 and the perimeter wall 18. The first pin receiver 24 is configured to receive an upper pin 26 extendable through the drive shaft 22 to frictionally engage the drive shaft 22 and first coupler 12 as is shown in FIG. 2.

A second coupler 28 has an upper end 30, a lower end 32 and a peripheral wall 34 extending between the upper 30 and lower 32 ends. A post 36 is attached to and extends upwardly from the upper end 30. The post 36 has a notch 38 therein extending around a periphery of the post 36. A disc 39 is defined between the notch 38 and a terminal end 40 of the post 36. The disc 39 has a cut out 42 therein to facilitate passage of a pin, described below as lower pin 44, from the notch 38 and around the disc 39 to an area beyond the terminal end 40. As can be seen in the Figures and in particular FIG. 4, the bottom end 16 has a lower well 46 extending upwardly therein to removably receive the post 36. A second pin receiver 48 extends through the lower well 46 and through the perimeter wall 18. A lower pin 44 is positioned in the second pin receiver 48. A best shown in FIG. 4, the post 36 is rotatable to engage or disengage from the lower pin 44 and in FIG. 4 it is shown in an engaged position restricting removal of the post 36 from the second coupler 28.

An auger connector 50 is attached to and extends downwardly from the lower end 16. As can be seen in the Figures, the auger connector 50 may have the same structure as an end section of the drive shaft 22 to engage the auger blade in a conventional, laborious manner.

A sleeve 52 is slidably mounted on the perimeter wall 18 and is removably slidable over the peripheral wall 34 such that the sleeve 52 engages, simultaneously each of the first 12 and second 28 couplers to prevent the first coupler 12 from rotating with respect to the second coupler 28. The first 12 and second 28 couplers thus have non-circular shapes and may in particular have rectangular or square cross-sections. The sleeve 52 is disengageable from the second coupler 28 to allow rotation of the post 36 with respect to the first coupler 12 to release the post 26 from the lower well 46. A stop 54 is positioned on the second coupler 28 between the upper 30 and lower 32 ends and prevents the sleeve 52 from sliding down of off the second coupler 28.

In use, the assembly 10 is used to couple together an auger blade, or bit, and a drive shaft 22 from a motor in such a manner that allows a quick disconnect between the two when the auger blade must be removed for storage, shipment or replacement. The assembly 10 is retrofittable to existing devices as its structure allows for engagement with conventional auger structures.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A drive shaft connection assembly for an auger connection post, said assembly including:
    a first coupler having a top end, a bottom end and a perimeter wall being attached to and extending between said top and bottom ends;
    said top end having an upper well therein configured for receiving and releasably engaging a drive shaft;
    a second coupler having an upper end, a lower end and a peripheral wall extending between said upper and lower ends, a post being attached to and extending upwardly from said upper end;
    an auger connector being attached to and extending downwardly from said lower end;
    said bottom end having a lower well extending upwardly therein to removably receive said post, said post being rotatable with respect to said first coupler to selectively engage or disengage said first coupler;
    a sleeve being slidably mounted on said perimeter wall, said sleeve being removably slidable over said peripheral wall such that said sleeve engages each of said first and second couplers to prevent said first coupler from rotating with respect to said second coupler, wherein said sleeve is disengageable from said second coupler to allow rotation of said post with respect to said first coupler to release said post from said lower well; and
    wherein said post has a notch therein extending around a periphery of said post, a disc being defined between said notch and a terminal end of said post, said disc having a cut out therein such that an outer surface of said disc parallel to a longitudinal axis of said post includes an arcuate section and a planar section to facilitate passage of a pin from said notch to an area beyond said terminal end, a second pin receiver extending through said lower well and through said perimeter wall, a lower pin being positioned in said second pin receiver, said post being rotatable to engage or disengage from said lower pin.

2. The drive shaft connection assembly according to claim 1, wherein said first coupler has a first pin receiver therein extending through said upper well and said perimeter wall, said first pin receiver being configured to receive an upper pin extendable through said drive shaft.

3. A drive shaft connection assembly for an auger connection post, said assembly including:
    a first coupler having a top end, a bottom end and a perimeter wall having a polygonal outer surface being attached to and extending between said top and bottom ends;
    said top end having an upper well therein configured for receiving and releasably engaging a drive shaft, said first coupler having a first pin receiver therein extending through said upper well and said perimeter wall, said first pin receiver being configured to receive an upper pin extendable through said drive shaft;
    a second coupler having an upper end, a lower end and a peripheral wall extending between said upper and lower ends, a post being attached to and extending upwardly from said upper end, said post having a notch therein extending around a periphery of said post, a disc being defined between said notch and a terminal end of said post, said disc having a cut out therein such that an outer surface of said disc parallel to a longitudinal axis of said post includes an arcuate section and a planar section to facilitate passage of a pin around said notch to an area beyond said terminal end;
    an auger connector being attached to and extending downwardly from said lower end;
    said bottom end having a lower well extending upwardly therein to removably receive said post, a second pin receiver extending through said lower well and through said perimeter wall, a lower pin being positioned in said second pin receiver, said post being rotatable to engage or disengage from said lower pin; and
    a sleeve being slidably mounted on said perimeter wall, said sleeve being removably slidable over said peripheral wall such that said sleeve engages each of said first and second couplers to prevent said first coupler from rotating with respect to said second coupler, wherein said sleeve is disengageable from said second coupler to allow rotation of said post with respect to said first coupler to release said post from said lower well.

* * * * *